United States Patent Office 2,792,381
Patented May 14, 1957

2,792,381

EPOXY ETHERS OF ACETYLENIC ALCOHOLS AND THEIR POLYMERS

Edward C. Shokal, Walnut Creek, and Harlan P. Wallingford, Lafayette, Calif., assignors to Shell Development Company, Emeryville, Calif., a corporation of Delaware No Drawing. Application March 10, 1954,
Serial No. 415,445

17 Claims. (Cl. 260—47)

This invention relates to a new class of epoxy ethers and to a method for their preparation. More particularly, the invention relates to new epoxy ethers prepared from acetylenic alcohols, and to the utilization of the epoxy ethers, particularly in the preparation of pottings and castings and in the preparation of improved coating compositions.

Specifically, the invention provides new and particularly useful polyfunctional polyepoxy polyethers comprising polyethers of acetylenic polyhydric alcohols and epoxy-substituted alcohols, said ethers preferably being prepared by reacting the acetylenic alcohol with an epoxy-halo-substituted alkane or dihalo-hydroxy-substituted alkane in an alkaline medium, or less preferably by reacting the acetylenic alcohol with the epoxy-halo-substituted alkanes or dihal-hydroxy-substituted alkanes in the presence of a condensation catalyst, such as an acid-acting catalyst, so as to produce the halohydrin ether of the acetylenic alcohol and then dehydrohalogenating that product to form the desired epoxy ether. The invention further provides polymers of the aforedescribed epoxy ethers obtained by polymerizing the ethers through the epoxy group by themselves or in admixture with other epoxy materials.

As a special embodiment, the invention provides higher molecular weight hydroxy-substituted polyether polyepoxides such as obtained by controlling the proportion of reactants in the afore-mentioned reaction between the acetylenic alcohol and epoxy-halo alkane in an alkaline medium, or by reacting the polyether polyepoxides described above with polyhydric compounds, or with polyhydric compounds and epoxy-forming materials. Polymers of these higher molecular weight products are also specially provided by the invention.

It is an object of the invention to provide a new class of epoxy ethers. It is a further object to provide new epoxy ethers of acetylenic alcohols and a method for their preparation. It is a further object to provide epoxy ethers of acetylenic alcohols that are particularly useful and valuable in the chemical and related industries. It is a further object to provide polyepoxy polyethers from acetylenic alcohols that are valuable in the preparation of pottings and castings, particularly for electrical apparatus. It is a further object to provide new polyether polyepoxides that can be cured to produce products having improved flexibility and distensibility. It is a further object to provide new polyether polyepoxides that have improved solubility and compatibility characteristics and can be used to prepare improved coating compositions. It is a further object to provide new polyether polyepoxides that can be cured to form films that are hard, flexible and durable. It is a further object to provide new epoxy-ethers that may be used as improved stabilizers for halogen-containing polymers. Other objects and advantages of the invention will be apparent from the following detailed description thereof.

It has now been discovered that these and other objects may be accomplished by the novel polyepoxy polyethers of the invention comprising ethers of acetylenic polyhydric alcohols and epoxy-substituted alcohols. These epoxy ethers are preferably prepared by reacting the acetylenic polyhydric alcohol with an epoxy-halosubstituted alkane or dihalo-hydroxy-substituted alkane in an alkaline medium, or less preferably by reacting the acetylenic alcohol with the epoxy-halo-substituted alkanes or dihalo-hydroxy-substituted alkanes in the presence of an acid-acting catalyst, such as hydrofluoric acid, so as to produce the halohydrin ether of the acetylenic alcohol and then dehydrohalogenating that product to form the desired epoxy ether. Higher molecular weight hydroxy-containing polyether polyepoxides, as described hereinafter, are obtained by controlling the proportions of reactants in the afore-mentioned reaction between the acetylenic alcohol and epoxy-halo alkane in an alkaline medium, or by reacting the polyether polyepoxide described above with polyhydric compounds, or with polyhydric compounds and epoxy-forming materials.

It has been found that the above-described polyether polyepoxides and the higher molecular weight derivatives possess unexpected beneficial properties which make them particularly adapted for many important commercial applications. It has been found, for example, that these epoxy ethers may be cured in the presence of epoxy-curing agents, such as metal salts, hydrogen fluoride complexes, amines and polycarboxylic acids, to form hard resinous products having improved flexibility. The polyether polyepoxides, and particularly the higher molecular weight derivatives, may be cured to form insoluble products having improved hardness and flexibility. They are thus suited for use in the preparation of castings and moldings and are particularly suited for use in preparing pottings and castings for electrical apparatus.

The polyether polyepoxides have improved solubility and compatibility characteristics and can be used in combination with curing agents and a wide variety of solvents and film-forming materials, and the like, to produce good surface coating compositions and good impregnating and sealing compositions.

The epoxy ethers of the present invention have also been found to be good stabilizing agents for halogen-containing polymers, such as polymers of vinyl chloride. It is believed that the epoxy groups and acetylenic group or groups present in these ethers act to absorb the released hydrogen chloride and thereby endow the composition with greatly improved resistance to discoloration through exposure to heat and light.

The acetylenic polyhydric alcohols used in the preparation of the novel epoxy ethers of the present invention comprise those alcohols having at least one triple bond between two carbon atoms and at least two hydroxyl groups which are preferably not more than 4 carbon atoms removed from an acetylenic linkage. These alcohols may be substituted with aromatic, aliphatic, cycloaliphatic, or heterocyclic radicals, and may contain other non-interfering substituents, such as halogen atoms, ether and ester radicals, and the like.

Acetylenic alcohols to be employed in preparing the claimed ethers include, among others, 2-butynediol-1,4, 2,5-diethyl-3-hexynediol-2,5, 3,5-dihydroxy-1,7-octadiyne, 3,5-dihydroxy-3,5-dibutyl-1,7-octadiyne, 2,8-decadiyne-diol-1,10, 2,5-dipropenyl-3-hexynediol-2,5, and the like.

A preferred group of acetylenic polyhydric alcohols comprise those obtained by condensing two moles of monoaldehyde or monoketone with acetylene according to the process set forth in U. S. 2,232,867. Ketones that may be used in the preparation of these alcohols may be exemplified by the aliphatic, aromatic and heterocyclic ketones as acetone, dibutyl ketone, methyl ethyl ketone, vinyl ethyl ketone, cyclohexane, cyclopentanone, methyl isopropyl ketone, methyl isobutyl ketone, mesityl oxide, diacetone alcohol, levulinic acid, acetonylacetone, acetophenone, isophorone, methyl benzyl ketone, butylbenzyl ketone, acetyl acetone, and the like.

Aldehydes that may be used in the process may be exemplified by formaldehyde, acrolein, acetaldehyde, propionaldehyde, 2-pentenal, butyraldehyde, 2,4-pentadienal, caproaldehyde, valeraldehyde, crotonaldehyde, and cinnamaldehyde. Examples of the acetylenic alcohols that may be prepared in this manner include, among others, 2-butynediol-1,4, 2,5-diethyl-3-hexynediol-2,5, 1,4-diphenyl-2-butynediol-1,4, 2,5-dihexyl-3-hexynediol - 2,5, 3,6-diamyl-4-octynediol-3,6, 1,7-octadiynediol - 3,6, 3,6-dibutyl-1,7-octadiynediol - 3,6, 2,8-decadiynediol - 1,10, 2,5-dipropenyl - 3 - hexynediol - 2,5, and 2,5-dicyclohexyl-3-hexynediol-2,5, and the like. Particularly preferred members of this group of alcohols are those of the formula

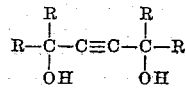

wherein R is hydrogen or a hydrocarbon radical, and preferably an alkyl, cycloalkylaryl, arylalkyl or alkaryl radical containing no more than 12 carbon atoms.

Another preferred group of acetylenic polyhydric alcohols comprise those obtained by condensing a polyketone or polyaldehyde with two moles of acetylene or substituted acetylenes. Polyketones and polyaldehydes that may be used in this reaction may be exemplified by butanedial-1,4, pentanedial - 1,5, cyclohexanedial - 1,4, octanedial - 1,6, 4 - hydroxyhexanedial - 1,6, hexanedione-3,5, octanedione - 3,6, cyclohexanedione - 1,4, chlorocyclohexanedione - 1,4, and the like. Preferred members of this group comprise those of the formula

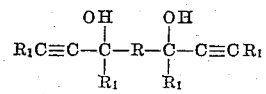

wherein R is the residue of the polyketone or polyaldehyde between the two ketone or aldehyde groups, and is preferably a divalent hydrocarbon radical, oxa- or thia-substituted hydrocarbon radical, and R₁ is hydrogen or a hydrocarbon radical, particularly an alkyl, cycloalkyl, aryl arylalkyl and alkaryl radical, which preferably contain no more than 12 carbon atoms.

Still another preferred group of acetylenic polyhydric alcohols comprise those obtained by heating and reaction, preferably in a suitable solvent, such as a hydrocarbon acetylene derivative, two moles of a monoepoxide with acetylene or one mole of a polyepoxide with two moles of acetylene or a substituted acetylene. Epoxides that may be used in this reaction may be exemplified by ethylene oxide, propylene oxide, vinyl cyclohexene dioxide, butadiene dioxide, 1,4-bis(2,3-epoxypropoxy)benzene, 1,3-bis (2,3-epoxypropoxy)benzene, 4,4'-bis(2,3 - epoxypropoxy) diphenyl ether, 1,8-bis(2,3-epoxypropoxy)octane, 1,4-bis (2,3-epoxypropoxy)cyclohexane, 4,4'-bis(2-hydroxyl - 4- epoxybutoxy) diphenyldimethylmethane, 1,3 - bis(4, 5-epoxypentoxy) - 5 - chlorobenzene, 1,4-bis(3,4 - epoxybutoxy)-2-chlorocyclohexane, diglycidyl ether, 1,3-bis(2-hydroxy-3,4 - epoxybutoxy)benzene, 1,2,3,4-tetra (2-hydroxy-3,4-epoxybutoxy)butane, and diglycidyl sulfide. Also included in this group are the polyepoxides obtained by reacting epichlorohydrin with polyhydric phenols or alkane polyols and then dehydrochlorinating the resulting halohydrin. Polymers of unsaturated epoxides, such as allyl glycidyl ether, may also be used. It should also be understood that the polyepoxy ethers of the acetylenic alcohols produced by the process of the present invention may also be further reacted with acetylene as described above to produce alcohols for further reaction with the epoxy-forming materials. Preferred members of these alcohols prepared from the polyepoxides comprise those of the formula

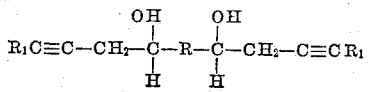

wherein R is the residue of the polyepoxide between the two epoxy groups and is preferably a hydrocarbon radical, an oxahydrocarbon radical or a thiahydrocarbon radical, preferably containing not more than 18 carbon atoms, and R₁ is hydrogen or hydrocarbon radical.

The novel epoxy ethers of the invention comprise the ethers of any one of the above-described acetylenic alcohols and any one of the above-described epoxy alcohols. The ethers may be obtained by various methods. One particularly preferred method comprises reacting the acetylenic alcohol with an epoxy-halo-substituted alkane or a dihalo-hydroxy-substituted alkane in an alkaline medium.

It was unexpected to find that this method could be used to prepare the epoxy ethers because it was felt that the acetylenic OH groups were not active enough to react with the epoxy compounds in the presence of the alkaline medium and more active catalysts were needed to effect the reaction.

The expression "halo-epoxy-substituted alkanes" as used herein refers to those alkanes having a 1,2-epoxy group, i. e., a

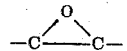

group (otherwise known as a vic-epoxy group as the oxygen atom is attached to vicinal carbon atoms), attached directly to a halogen-bearing carbon atom, such as, for example, epichlorohydrin, epibromohydrin, 1,4-dichloro-2,3-epoxybutane, 1-chloro-2,3-epoxypentane, and the like. The expression "dihalo-hydroxy-substituted alkanes" as used herein refers to those alkanes having a series of three carbon atoms one of which is attached to a halogen atom, the next is attached to a hydroxyl group and the last is attached to a halogen atom, such as, for example, 1,3-dichloro-2-hydroxypropane, 2,4-dibromo-3-hydroxypentane, 2,3 - dichloro - 3 - hydroxybutane, and the like. Epichlorohydrin comes under special consideration because of its low cost and because of the superior properties of the epoxides obtained therefrom.

The amount of the alcohol and epoxy-forming material to be employed in this reaction will vary depending upon the type of product desired. If simple monomeric type products are desired, the acetylenic alcohol and epoxy-forming material are preferably reacted in chemically equivalent ratios varying from 1:4 to 1:8. If higher molecular weight hydroxy-containing products are desired, the epoxy-forming materials are used in smaller amounts and the acetylenic alcohol and epoxy-forming materials are reacted in chemical equivalent ratios varying from 2:1 to 1.8:1. As used herein, "chemical equivalent" amount refers to the amount needed to furnish one OH group for every epoxy group.

Higher molecular weight products prepared from the dihydric alcohols and epichlorohydrin by varying the reactants as indicated above are preferably those of the formula

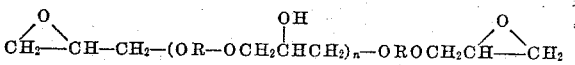

wherein R is the residue of the acetylenic alcohol obtained by removing the two OH groups, and n is an integer from 0 to 5.

The desired alkalinity is obtained by adding basic substances, such as sodium or potassium hydroxide. The alkali is employed in at least chemical equivalent amounts, e. g., one mole of alkali for every epoxy group to be reacted, and is preferably utilized in excess of the epoxy-halo-substituted alkane.

The above reaction is preferably conducted by heating the mixture at temperatures ranging from about 50° C. to 150° C., and more preferably from about 80° C. to 125° C. Atmospheric, superatmospheric, or subatmospheric pressures may be utilized as desired.

The water formed in the reaction may be removed during or at the end of the reaction. At the completion of the reaction, the water and excess reactants, such as excess halo-epoxy-substituted alkanes are preferably removed by distillation and the residue that remains then treated with an appropriate solvent, such as benzene, and filtered to remove the salt. The product that remains may then be purified by any suitable method, such as distillation, extraction, and the like.

The novel epoxy ethers may also be obtained by reacting the above-described acetylenic alcohols with an epoxyether forming material of the group consisting of halo-epoxy-substituted alkanes and dihalo-hydroxy-substituted alkanes in the presence of a catalyst, such as an acid-acting catalyst, and then dehydrohalogenating the resulting product. The halo-epoxy-substituted alkanes and dihalo-hydroxy-substituted materials used in this reaction are the same as those described above for the reaction in the alkaline medium.

The proportion of the acetylenic alcohol and the epoxy-forming material used in preparing the novel polyether polyepoxides of the invention may vary over a considerable range depending upon the type of products desired. If all of the hydroxyl groups on the alcohol molecule are to be etherified with the epoxy alcohol, the alcohol is combined with at least a chemical equivalent amount of the epoxy-forming material, and more preferably, with from 1.1 to 3 equivalents of the epoxy-forming material. As used herein in reference to the alcohols and epoxy-forming material, the expression "chemical equivalent amount" refers to that amount needed to furnish one epoxy or halogen for every hydroxyl group. If products having residual hydroxyl groups are desired, the alcohol should, of course, be combined with less than a chemical equivalent amount of the epoxy-forming material, such as from .9 to .5 equivalent of the epoxy-forming material.

The reaction between the acetylenic alcohol and the epoxy-forming material is effected in the presence of condensation catalysts, such as acid-type catalysts including HF, H₂SO₄, H₃PO₄, salts, such as SnCl₄, and BF₃ ether complexes. The concentration of the catalyst will vary depending upon the individual catalyst. In general, the catalysts are employed in amounts varying from about .1% to about 5% by weight of the reactants. The more active catalysts, such as the BF₃ complexes, are preferably employed in amounts varying from about .1% to about 1% while the less active catalysts, such as SnCl₄, are preferably used in amounts varying from about .5% to about 4%, as indicated in U. S. 2,260,753 and U. S. 2,380,185.

The condensation may be effected in the presence or absence of solvents or diluents. In most cases, it is preferred to employ a solvent, such as cyclohexane, benzene, tetrahydrofuran, and the like.

Temperatures generally range from about 25° C. to 150° C., and more preferably, between 50° C. and 120° C. In general, the higher temperatures give darker products and are less preferred than the lower temperatures.

The condensation may be carried out in a variety of ways. The two reactants may be mixed at room temperature and the catalyst then added, or the catalyst may be added to one reactant and the other reactant added to that mixture.

The product obtained by reacting the acetylenic alcohol with the epoxy-forming material in the presence of the above-described condensation catalyst is then treated with an alkaline material to dehydrohalogenate the said product. This treatment may be accomplished by adding the alkaline material to the reaction mixture obtained in the above-described process, or the condensation product may be recovered from the reaction mixture by any suitable means, such as distillation, extraction, and the like, before it is combined with the alkaline material. Any of the known dehydrohalogenating materials may be used in this reaction, such as sodium and potassium hydroxide, sodium and potassium carbonates and bicarbonates, borax, hydroxides or magnesium, zinc, lead, iron and aluminum, and the corresponding oxides, etc. The aluminates, silicates and zincates of alkali salts, such as sodium and potassium aluminate and sodium and potassium zincate, are particularly good dehydrohalogenating agents when used in substantially, or completely, non-aqueous media.

The amount of the dehydrohalogenating agent used may vary over a considerable range. If all of the

groups are to be converted to epoxy groups, the halohydrin should be reacted with an amount of the alkaline material which is at least equivalent to the hydrogen halide content of that halohydrin. Thus, if all of the halohydrin groups on the condensation product of epichlorohydrin and 2-butynediol-1,4

$$Cl-CH_2-\underset{|}{\overset{OH}{C}}H-CH_2-O-CH_2-C\equiv C-CH_2-O-CH_2-\underset{|}{\overset{OH}{C}}H-CH_2Cl$$

are to be converted to epoxy groups, the above product should be reacted with approximately 2 moles of the alkaline material. Less than the equivalent amount of the alkaline material may be used if all of the halohydrin groups are not to be converted to the epoxy groups.

In most cases, the alkaline material may be applied to the halohydrin as an aqueous solution or suspension or dissolved in an inert solvent, such as ethers, esters, hydrocarbons, halogenated hydrocarbons, and the like. If the above-noted aluminates, silicates or zincates are used as the alkaline material, the dehydrohalogenation is preferably effected in a non-aqueous medium and the salts as by themselves or dissolved in organic solvents or diluents. Carbon tetrachloride, 1,4-dioxane and dichloroethyl ether are particularly satisfactory as solvents for this purpose.

In most cases, the dehydrohalogenation reaction is initiated on contact of the reactants at room temperature. The reaction is exothermic and sufficient heat is usually liberated to permit one to conduct the reaction at the desired temperature without resort to the use of external heating means. In some cases, it may be desirable to cool the reaction mixture during the contacting of the reactants. If reaction is conducted in the presence of water, it is generally preferred to maintain the temperature below about 50° C. to prevent hydrolysis of the epoxide groups. If the above-described aluminates, silicates and zincates are used as the alkaline material in a non-aqueous system, higher temperatures may be employed, such as those of the order of about 50° C. to 110° C. With this latter group of catalysts, the preferred temperatures generally range from about 30° C. to about 80° C.

At the end of the reaction period, the reaction mixture is then filtered through a suitable filtering medium, e. g., diatomaceous earth, to remove the alkali metal halide and any excess catalyst. The filtrate is then treated to recover the epoxide. If the reaction has been conducted in the presence of water, care should be taken to avoid hydrolysis of the epoxide groups during the separation process. This can be accomplished by various extraction or distillation methods using subatmospheric pressures and conditions unfavorable to hydrolysis of the epoxide groups. Separation may be conveniently effected by treating the aqueous reactant mixture in a continuous extraction apparatus wherein any suitable extractant such as an ester, alcohol, ether, hydrocarbon, etc., may be utilized. The extracted epoxide may be separated from its solution with the extractant by subjecting the preferably anhydrous solution to distillation or fractionation operation.

In the case where the reaction has been conducted in the absence of water but in the presence of solvents, as is preferably the case with the above-described aluminates, silicates and zincates, the novel polyepoxy polyethers may be recovered by any suitable method, such as distillation, extraction, and the like. If no solvent or diluent is employed, the polyether polyepoxide may be recovered and purified by any convenient method, such as distillation under reduced pressure, extraction, fractional precipitation, and the like.

Special polyether polyepoxides coming under the scope of the present invention may also be prepared by heating and reacting a mole of the above-described acetylenic alcohols with two moles of a polyepoxide, such as, for example, those described above for preparing acetylenic alcohols.

The polyether polyepoxides of the invention, such as described above, are fluid or viscous liquids to semi-solids. They have at least two epoxy groups per molecule and are substantially free of chlorine, i. e., contain less than 1% or 2% chlorine. The polyether polyepoxides are, in general soluble in most solvents, such as ketones, alcohols and liquid hydrocarbons, and are compatible with many synthetic oils and resins.

For certain applications, such as in the preparation of polymeric products, it is sometimes desirable to have higher molecular weight hydroxy-containing polyether polyepoxides. Such products may be obtained by varying the amount of the acetylenic alcohol and haloepoxy-substituted alkane in the alkaline medium, as described above, or by reacting the above-described polyether polyepoxides with polyhydric compounds. In this case the polyhydric compound reacts with the

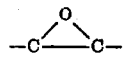

group to form

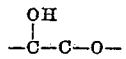

groupings. Higher molecular weight products may be obtained from diglycidyl 2-butynediol-4, for example, by reacting X moles of that compound with one mole of a polyhydric phenol having X OH groups. Such products have the formula

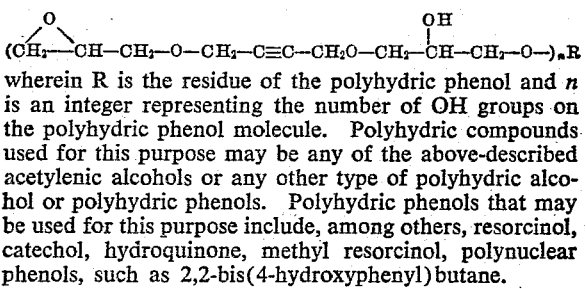

wherein R is the residue of the polyhydric phenol and $n$ is an integer representing the number of OH groups on the polyhydric phenol molecule. Polyhydric compounds used for this purpose may be any of the above-described acetylenic alcohols or any other type of polyhydric alcohol or polyhydric phenols. Polyhydric phenols that may be used for this purpose include, among others, resorcinol, catechol, hydroquinone, methyl resorcinol, polynuclear phenols, such as 2,2-bis(4-hydroxyphenyl)butane.

In case the polyhydric material employed in the above reaction is a polyhydric phenol, the reaction may generally be accomplished by merely heating the polyether polyepoxide prepared from the acetylenic alcohol with the phenol. In the case of the other polyhydric materials, such as other acetylenic polyhydric alcohols or alkane polyols, the reaction is usually quite slow and it is advisable to employ a catalyst, such as the above-described condensation catalysts employed for the reaction of the epoxy-forming material with the acetylenic alcohols. The condensation reaction may be effected under the same conditions as those shown above for reacting the epoxy-forming material with the acetylenic alcohols, e. g., the reaction may be conducted in the presence or absence of solvents or diluents and may be conducted at temperatures generally ranging from about 25° C. to 150° C. In case of the polyhydric phenols, preferred temperatures range from about 50° C. to about 80° C. With the other polyhydric materials, preferred temperatures range from about 40° C. to 120° C.

If the resulting higher molecular weight products possess less than the desired number of epoxy groups, such as may be the case when the dihydric material is reacted with less than a double molar quantity of the polyether polyepoxide prepared from the acetylenic alcohol, additional epoxy groups may be introduced by reacting the higher molecular weight product with additional quantities of the epoxy-forming material, e. g., quantities such as would furnish one epoxy group of each of the OH groups of the polyhydric material to be reacted. Thus, if the higher molecular weight product was obtained by reacting one mole of the polyether polyepoxide of the acetylenic alcohol with two moles of a dihydric phenol, the resulting higher molecular weight product would then be reacted with approximately two moles of the epoxy-forming material. The halohydrin obtained would then be dehydrohalogenated according to the above-described procedure used for preparing the polyether polyepoxides of the acetylenic alcohols themselves. The higher molecular weight products produced by the above method vary from viscous liquids to solids having relatively high melting points. They possess active epoxy groups as well as hydroxyl groups and may be cured or undergo further reaction through either of these functional groups.

The acetylenic epoxides or their higher molecular weight derivatives produced as shown in the preceding paragraph may be polymerized through the epoxy group to form valuable polymeric products. They may be polymerized alone or with other polyepoxide materials in a variety of different proportions, such as, for example, with amounts of other polyepoxides varying from 5% to 95% by weight. Polyepoxides that may be copolymerized with these acetylenic epoxides and higher molecular weight products include, among others, glycidyl polyethers of polyhydric phenols obtained by reacting polyhydric phenols, such as bis-phenol, resorcinol, and the like, with an excess of chlorohydrin, such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides. The glycidyl polyethers of polyhydric phenols obtained by condensing the polyhydric phenols with epichlorohydrin as described above are also referred to as "ethoxyline" resins. See Chemical Week, vol. 69, page 27, for September 8, 1951.

A great variety of different curing agents may be employed in effecting the above-described homo- and copolymerization. Such agents include, among others, carboxylic acids or anhydrides, such as formic acid, oxalic acid, or phthalic anhydride; Friedel-Crafts metal halides, such as aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; amino compounds, such as triethylamine, ethylene diamine, diethylamine, diethylene triamine, triethylene tetramine, dicyandiamide, melamine; and salts of inorganic acids, such as zinc fluoborate, potassium persulfate, nickel fluoborate, copper fluoborate, sellenium fluoborate, magnesium fluoborate, tin fluoborate, potassium perchlorate, cupric sulfate, cupric phosphate, cupric phosphite, magnesium arsenate, magnesium sulfate, cadmium arsenate, cadmium silicate, aluminum fluoborate, ferrous sulfate, ferrous silicate, manganese hypophosphite, nickel phosphate and nickel chloride.

The amount of the curing agents employed may vary over a considerable range depending upon the agent selected. With curing agents having replaceable hydrogen, such as the amine agents, amounts of agent employed vary up to and including equivalent proportions, i. e., sufficient curing agent to furnish a replaceable hydrogen atom for every epoxy group to be reacted. In most cases, satisfactory cures are obtained with amounts varying from 1% to 25% by weight of the material being polymerized. With the phosphoric acid and esters, particularly preferred amounts vary from about 1% to 10% by weight. The amino compounds are preferably employed in amounts varying from about 3% to 25% and the salts of the inorganic acids, such as the salts of fluoboric acid, are preferably employed in amounts varying from about 3% to 20% by weight. The other curing agents are preferably employed in amounts varying from 1% to 20%.

The higher molecular weight hydroxy-containing ethers may also be cured through the hydroxy group by the addition of appropriate amounts, e. g., 1% to 25% by weight of polybasic acids or anhydrides, polyisocyanates, and the like.

The polymerization is preferably effected by mixing the curing agent with the polyepoxide and heating the mixture together, preferably at temperatures ranging from about 40° C. to 200° C. Solvents or diluents may be employed in the polymerization depending upon the intended application of the polymer and ease of operation of the polymerization reaction.

If the polyether polyepoxides of the acetylenic alcohols and their higher molecular weight derivatives are to be used in the preparation of castings or pottings, the curing agent and the epoxy material are generally combined together and then poured into the desired mold or casting containing the electrical wires or apparatus and the mixture heated to effect the cure.

The polyether polyepoxides of the acetylenic alcohols and their higher molecular weight derivatives may also be employed with the afore-described curing agents to prepare improved surface coating compositions of the air-drying or baking type. In utilizing the products for this application, it is generally desirable to combine the epoxy material and curing agent with the desired solvents, and, if desired, other film-forming materials and driers, and then apply the resulting mixture to the surface to be coated. Film-forming materials that can be used with the epoxy material in this manner include the drying oils, such as tung oil, linseed oil, dehydrated castor oil, soyabean oil, and the like; cellulose derivatives such as cellulose nitrate, cellulose acetate, cellulose acetate butyrate, cellulose propionate, ethyl cellulose, and mixtures thereof; and vinyl polymers, such as polymers of vinyl chloride, vinylidine chloride, methyl methacrylate, diallyl phthalate, and the like. The coatings prepared in this manner may be allowed to set to a hard finish at room temperature or heat may be applied to hasten the cure.

The higher molecular weight hydroxy-containing derivatives of the polyether polyepoxides prepared from the acetylenic alcohols described above are particularly suited for use in preparing coating compositions as described above, as they may be reacted through the hydroxyl group or groups with drying oil fatty acids or may be cured through the hydroxyl groups with compounds, such as urea or diisocyanates.

The polyether polyepoxides of acetylenic alcohols and their higher molecular weight derivatives may also be employed with the curing agents to prepare valuable adhesive and impregnating compositions. In utilizing the products for these applications, it is generally desirable to combine the epoxy material with suitable solvents or diluents, such as benzene, toluene, acetonitrile, and the like, so as to form a spreadable fluid and then the curing agent added and the mixture applied to the desired surface.

In addition to their use in forming the above-described polymeric products, the claimed epoxy ethers and their higher molecular weight derivatives may be used as stabilizing agents for various halogen-containing polymers, and particularly the vinyl halide polymers. These products are compatible with the polymers and in combination therewith give good resistance to discoloration by heat and light. These products may be used as stabilizers, alone or in combination with other stabilizing agents, such as urea and thiourea derivatives. In most cases, the products are effective as stabilizers in amounts varying from about .1% to 5% by weight of the polymer being stabilized. The epoxy materials may be combined with the halogen-containing polymer by any suitable method, such as by dissolving the products in a suitable solvent or by milling the products together on a suitable roll mill.

The novel epoxy ethers and their higher molecular weight derivatives also find application as intermediates in the preparation of other valuable chemical products. They may be further reacted through the epoxy group with mono-functional derivatives or may be reacted through the acetylenic groups.

The novel products of the invention may also be reacted with halogens or hydrogen halide as by the method shown in U. S. 1,868,077, to produce haloethylenic derivatives. The reaction of chlorine with the diglycidyl ether of 2-butynediol-1,4, for example, may be represented by the following equation:

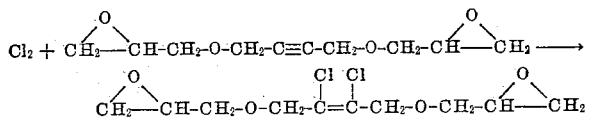

These ethylenically unsaturated epoxides may then be further reacted through the double bond as by polymerization with ethylenically unsaturated compounds to produce new and valuable epoxy containing materials. Special products may be obtained in this manner by polymerizing the unsaturated epoxides with monoethylenically unsaturated compounds, such as styrene, acrylonitrile, vinyl chloride, allyl acetate, diethyl maleate, vinylidene chloride, vinylpyrollidone, vinylpyridine, vinyl ethyl ether, and the like.

The acetylenic epoxides also may undergo other known reactions of acetylenic compounds, such as reaction with alcohols to form vinyl ethers and reaction with various aliphatic carboxylic acids to form vinyl esters.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

*Example 1*

This example illustrates the preparation of diglycidyl ether of 2-butynediol-1,4 using a $BF_3$ catalyst to form the halohydrin ether and then dehydrohalogenating the resulting product.

86 parts of 2-butynediol-1,4 and 100 parts of dry benzene were added to a 3-neck reaction kettle equipped with stirrer, thermometer and dropping funnel. This mixture, under vigorous stirring, was heated to 80° C. and then cooled to 50° C. 0.86 part of $BF_3$-ethyl ether catalyst was added and then 185 parts of epichlorohydrin was slowly added in portions so as to keep the temperature at about 50° C. Dry ethyl ether was also added portionwise so as to keep the temperature at about 50° C. The resulting product, which contained the dihalohydrin ether of 2-butynediol-1,4 was then treated with 120 parts of sodium hydroxide made up as a 50% aqueous solution. This mixture was then maintained at 30° C. to 40° C. for about one hour. The mixture was extracted with ether, washed and then solvent removed by heating on the steam bath. The remaining liquid was then distilled under a high vacuum and the heart cut was redistilled to give a fluid liquid boiling at 140° C. to 142° C. (1 mm.)

that was identified as the diglycidyl ether of 2-butynediol-1,4.

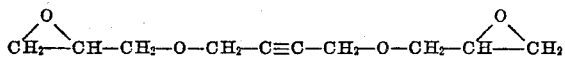

Ref. index 1.4783 20/d, molecular weight cal. 198, found 196. Epoxy value of 0.966, cal. 0.990, carbon 58.9, cal. 60.5, hydrogen 7.1, cal. 7.1.

Portions of the diglycidyl ether of 2-butynediol-1,4 produced above were then heated at 65° C. with each of the curing agents shown in the following table. In each case, the resulting product was a solid flexible casting.

| Curing Agent | Amount, percent | Product |
| --- | --- | --- |
| HBF$_4$-diethylaniline complex | 5 | hard, flexible purple casting. |
| Magnesium perchlorate | 5 | hard, flexible yellow casting. |
| Metaphenylene diamine | 21 | hard, flexible casting. |
| 2,4,6-Triaminotoluene | 18 | Do. |
| Ethylene diamine | 5 | rubbery casting. |
| Diethylene triamine | 5 | Do. |

Glycidyl ethers having related properties may be obtained by replacing the 2-butynediol in the above-described preparation process with equivalent amounts of each of the following acetylenic polyhydric alcohols: 2,5-dimethyl-3-hexynediol-2,5, 3,6-dimethyl-4-octynediol-3,6, 1,4-diphenyl-2-butynediol-1,4 and 1,7-octadiynediol-3,6.

*Example II*

This example illustrates the preparation of diglycidyl ether of 2-butynediol-1,4 and higher molecular weight products by reacting epichlorohydrin with 2-butynediol-1,4 in an alkaline medium.

250 parts of epichlorohydrin, 50 parts of 2-butynediol-1,4 and 46.5 parts of NaOH pellets (dissolved in 50 parts of water) were combined in a reaction kettle equipped with dropping funnel, water separation head, stirrer and thermometer. The mixture was stirred and heated at 90° C. for two hours. The residue that remained was combined with an approximately equal quantity of benzene and the mixture filtered to remove the salt. After the last traces of salt were removed by washing with water, the benzene was evaporated and the product distilled under vacuum to yield diglycidyl ether of 2-butynediol-1,4 having substantially the same properties as the product shown in Example I.

Higher molecular weight products of the formula

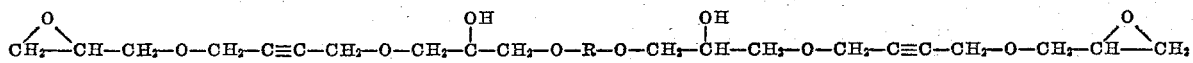

wherein $n$ is an integer from 1 to 5 are then obtained by varying the proportions of reactants. Viscous liquid products of the above formula are formed, for example, by combining the epichlorohydrin and 2-butynediol-1,4 in an equivalent ratio of 1:1.8 to 1:2.

The above products could be polymerized with the catalysts shown in Example I to give hard, flexible castings.

*Example III*

This example illustrates the preparation and some of the properties of the diglycidyl ether of 4-octynediol-2,7.

141 parts of 4-octynediol-2,7 (obtained from acetylene and propylene oxide) and 100 parts of dry benzene are added to a 3-neck reaction kettle as shown in Example I and the mixture heated to 80° C. and then cooled to 50° C. 1.42 parts of BF$_3$-ethyl ether catalyst is added and the 185 parts of epichlorohydrin is slowly added in portions so as to keep the temperature at about 50° C. Dry ethyl ether is also added portionwise so as to keep the temperature low. The resulting product which contains the dihalohydrin ether of 4-octynediol-2,7 is then treated with 120 parts of sodium hydroxide made up as a 50% aqueous solution. This mixture is then maintained at 40° C. for one hour. The mixture is extracted with ether, washed and the solvents removed. The remaining liquid is then distilled to yield a liquid identified as the diglycidyl ether of 4-octynediol-2,7.

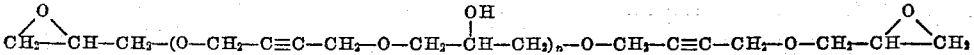

Portions of the diglycidyl ether produced above are then treated by 5% by weight of magnesium perchlorate and metaphenylene-diamine and the mixture heated to 65° C. In each case, the mixture sets up to hard, flexible castings.

Glycidyl ethers having related properties are obtained by replacing the 4-octynediol-2,7 in the above-described preparation process with equivalent amounts of each of the following acetylenic alcohols: 1,8-dibutoxy-4-octynediol-2,7,3-hexynediol-1,6, and 2,7-dimethyl-4-octynediol-2,7.

*Example IV*

This example illustrates the preparation of a higher molecular weight glycidyl ether by reacting the diglycidyl ether of 2-butynediol-1,4 produced in Example I with bis-phenol, i. e., 2,2-bis(4-hydroxyphenyl)propane.

198 parts of diglycidyl ether of 2-butynediol-1,4 is mixed with 114 parts of bis-phenol and 200 parts of dry benzene and the mixture heated to 80° C. for several hours and then allowed to stand overnight. The mixture is then distilled under vacuum to remove the solvent. The resulting product is a viscous liquid made up substantially of a diglycidyl polyether of the formula wherein R is the residue of the bis-phenol molecule.

Portions of the above-described high molecular weight diglycidyl polyether may be cured by heating with 5% by weight of meta-phenylenediamine, or may be cured through the hydroxyl groups by heating with 10% by weight of hexamethylene diisocyanate.

Drying oil fatty acid esters of the above-described diglycidyl polyether, such as obtained by reacting the polyether with tung oil fatty acids or soyabean oil fatty acids, may be used in preparing varnishes having good hardness and durability.

Glycidyl polyethers having related properties may be obtained by replacing the bis-phenol in the above-described preparation process with equivalent amounts of each of the following phenols: resorcinol, catechol, hydroquinone, 4,4'-dihydroxybenzophenone and 2,2-bis(4-hydroxyphenyl)pentane.

*Example V*

Coating compositions were prepared by mixing 62% by weight of the diglycidyl ether of 2-butynediol-1,4 produced in Example I with 38% by weight of a solvent made up of 50 parts of methyl ethyl ketone and 50 parts of toluene, and curing agents as indicated below. The solutions were then brushed on tin and glass panels and cured at 170°

C. for four hours. The results are shown in the following table:

| Catalyst | Amount, Percent | Condition of Film |
|---|---|---|
| HBF₄-diethylaniline | 5 | Hard film resistant to solvents. |
| 2,4,6-Triaminotoluene | 18 | Do. |
| M-phenylene diamine | 21 | Do. |

We claim as our invention:

1. Compounds of the group consisting of ethers of an acetylenic polyhydric alcohol wherein the OH groups are connected to the —C≡C— group only through carbon and a vic-epoxy-substituted alkanol, and their corresponding halo-hydrins.

2. An ether of an acetylenic polyhydric alcohol wherein the OH groups are connected to the —C≡C— group only through carbon and a vic-epoxy substituted alkanol.

3. A glycidyl ether of an acetylenic dihydric alcohol wherein the OH groups are connected to the —C≡C— group only through carbon.

4. A glycidyl ether of the formula

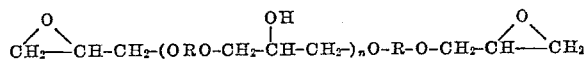

wherein R is a bivalent hydrocarbon radical obtained by removing two OH groups from an acetylenic alcohol wherein the OH groups are connected to the —C≡C— group only through carbon and $n$ is an integer from 0 to 5.

5. A glycidyl ether of an acetylenic dihydric alcohol of the formula

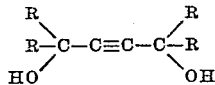

wherein R is a member of the group consisting of hydrogen and hydrocarbon radicals.

6. A glycidyl polyether obtained by heating at a temperature of 25° C. to 150° C. two moles of (1) a diglycidyl ether of an acetylenic polyhydric alcohol wherein the OH groups are connected to the —C≡C— group only through carbon with one mol of (2) a dihydric phenol.

7. A glycidyl ether of an alkynediol containing no more than 10 carbon atoms.

8. A glycidyl ether of 2-butynediol-1,4.
9. A glycidyl ether of 4-octynediol-2,7.
10. A glycidyl ether of 2,5-dimethyl-3-hexynediol-2,5.
11. A glycidyl polyether comprising the reaction product of two moles of a diglycidyl ether of 2-butynediol-1,4 and a mole of a polyhydric phenol.
12. A process for preparing new epoxy ethers containing a

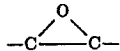

group which comprises mixing an acetylenic polyhydric alcohol wherein the OH groups are connected to the —C≡C— group only through carbon with an epoxy-forming material of the group consisting of halo-substituted alkanes possessing a

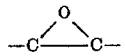

group and dihalo-hydroxy-substituted alkanes, in the presence of an alkaline condensation catalyst.

13. A process as in claim 12 wherein the epoxy-forming material is epichlorohydrin.

14. A process as in claim 12 wherein the acetylenic polyhydric alcohol is one of the formula

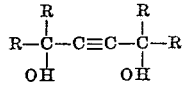

wherein R is a member of the group consisting of hydrogen and hydrocarbon radicals.

15. A polymer of the ether defined in claim 1 obtained by polymerizing the ether through the epoxy groups.
16. A polymer of the ether defined in claim 6 obtained by polymerizing the ether through the epoxy groups.
17. A polymer of the ether defined in claim 11 obtained by polymerizing the ether through the epoxy groups.

References Cited in the file of this patent

UNITED STATES PATENTS

| 2,512,996 | Bixler | June 27, 1950 |
| 2,538,072 | Zech | Jan. 16, 1951 |

OTHER REFERENCES

Johnson: The Chemistry of the Acetylenic Compounds, London, 1946, pp. 40, 75, 135, 136 and 230. Copy in Div. 38.